(12) United States Patent
Menges et al.

(10) Patent No.: US 8,011,832 B2
(45) Date of Patent: Sep. 6, 2011

(54) LINEAR GUIDE

(75) Inventors: Martin Menges, Homburg (DE);
Dietmar Rudy, Kleinbundenbach (DE);
Michael Rebmann, Niedergailbach (DE)

(73) Assignee: Schaeffler KG, Herzogenaurach (DE)

( * ) Notice: Subject to any disclaimer, the term of this patent is extended or adjusted under 35 U.S.C. 154(b) by 430 days.

(21) Appl. No.: 12/294,954

(22) PCT Filed: Mar. 26, 2007

(86) PCT No.: PCT/EP2007/052851
§ 371 (c)(1),
(2), (4) Date: Oct. 29, 2008

(87) PCT Pub. No.: WO2007/113152
PCT Pub. Date: Oct. 11, 2007

(65) Prior Publication Data
US 2010/0177996 A1  Jul. 15, 2010

(30) Foreign Application Priority Data
Mar. 31, 2006 (DE) .......... 10 2006 014 943

(51) Int. Cl.
*F16C 29/06* (2006.01)
(52) U.S. Cl. ........................................ 384/45
(58) Field of Classification Search ........... 384/8, 15, 384/43–45, 48–51, 429–430
See application file for complete search history.

(56) References Cited

U.S. PATENT DOCUMENTS

| | | | | |
|---|---|---|---|---|
| 4,114,961 A * | 9/1978 | Pithie | | 384/430 |
| 4,231,623 A * | 11/1980 | Kaufman | | 384/429 |
| 4,684,267 A * | 8/1987 | Fetouh | | 384/429 |
| 6,333,628 B1 | 12/2001 | Yeh et al. | | |
| 6,857,780 B2 * | 2/2005 | Morr et al. | | 384/15 |
| 6,938,590 B2 * | 9/2005 | Buelna | | 123/56.8 |
| 7,096,595 B2 * | 8/2006 | Greubel | | 33/706 |
| 7,547,141 B2 * | 6/2009 | Chen et al. | | 384/45 |
| 7,553,084 B2 * | 6/2009 | Chen | | 384/45 |
| 7,736,059 B2 * | 6/2010 | Chen et al. | | 384/15 |
| 2001/0015581 A1 | 8/2001 | Sato | | |
| 2008/0193063 A1* | 8/2008 | Chen et al. | | 384/45 |
| 2008/0292226 A1* | 11/2008 | Chen et al. | | 384/15 |

FOREIGN PATENT DOCUMENTS

| | | |
|---|---|---|
| DE | 41 02 708 | 8/1991 |
| DE | 93 17 161 A | 1/1994 |
| DE | 103 47 360 | 5/2005 |
| DE | 10356854 A1 * | 7/2005 |

* cited by examiner

*Primary Examiner* — Marcus Charles
(74) *Attorney, Agent, or Firm* — Lucas & Mercanti, LLP

(57) ABSTRACT

A linear guide, which has a guide carriage that is mounted in a longitudinally moveable manner on a guide rail and to which an additional component, for example a measuring head, can be fastened by a fastening device. The fastening device has a pin which is fastened to the guide carriage at the end side. The pin has a fastening section to which the additional component can be fastened, that projects from the guiding carriage at the end side.

9 Claims, 2 Drawing Sheets

LINEAR GUIDE

This application is a 371 of PCT/EP2007/052851 filed Mar. 26, 2007, which in turn claims the priority of DE 10 2006 014 943.2 filed Mar. 31, 2006, the priority of both applications is hereby claimed and both applications are incorporated by reference herein.

FIELD OF THE INVENTION

The present invention relates to a linear guide in which a guide carriage is mounted in a longitudinally displaceable manner on a guide rail. Linear guides of this type are broadly used for example in machine tools or else in assembly lines.

BACKGROUND OF THE INVENTION

DE 103 47 360 A1 discloses for example a linear guide with a measuring device, in which a guide carriage is provided at one front end thereof with a measuring head. Many applications are increasingly demanding the possibility of precisely determining the position of the guide carriage on the guide rail. For this purpose, the aforementioned measuring heads, which are extended to control devices for controlling drive units, are attached to these guide carriages. Measuring heads of this type or other additional components which are to be flanged onto the guide carriage must be properly oriented relative to the guide rail. This necessitates the provision of a fastening device allowing an additional component of this type to be attached to the guide carriage in an properly oriented manner. DE 103 47 360 A1 proposes providing an adapter plate between the guide carriages and the additional component. This adapter plate is fastened to the guide carriage with the aid of screws. The adapter plate is then trimmed by surface milling, so that the surface, which is faced, forms a plane running exactly orthogonally to the longitudinal axis A of the guide rail. Subsequently, the entire measuring head is fastened to the adapter plate by inserting pins and stays into the positioning holes or receiving holes provided for this purpose. By screwing the threaded pins into the transverse holes, the measuring head is finally fastened to the adapter plate with correct positioning.

The guide carriage consists of a supporting body and head pieces attached to the supporting body at the front end. Each head piece is screwed onto the supporting body by means of two fastening screws. These fastening screws have at their end remote from the supporting body threaded holes into which the fastening screws of the adapter plate engage.

The object of the present invention is to disclose a linear guide that is simplified compared to the known linear guide with regard to the receiving of an additional component.

SUMMARY OF THE INVENTION

According to the invention, this object is achieved in that the fastening device has a journal which is fastened to the guide carriage at the front end and has a fastening portion which projects from the guide carriage at the front end and to which the additional component can be fastened. The advantage of the linear guide according to the invention can be seen in the fact that the adapter plate is dispensed with. The journals provided in accordance with the invention serve directly to fasten the additional component.

In a development according to the invention, the journal is provided with a first alignment face, which is arranged inclined relative to the journal axis, on a first opposing face of the guide carriage for orienting the journal relative to the guide carriage. This alignment face can for example be a shoulder resting against a prepared opposing face of the guide carriage.

If the guide carriage has in a known manner a supporting body and head pieces which are attached to the supporting body at the front, it is expedient if the journal penetrates the head piece, the fastening portion projecting from the head piece at the front end. This ensures that the journal fastened to the guide carriage does not for example clamp, but rather leaves unloaded the head pieces which are often made of plastics material. For example, these head pieces can be provided with through-holes through which the journals are guided. The head pieces per se can be fastened to the supporting body by further screws.

The fastening portion, which juts out from the head piece, is ideally dimensioned sufficiently long to support the additional component well, viewed over its depth in the axial direction of the journal.

The journal can rest with its first alignment face, for example a shoulder, against an opposing face of the supporting body, and thus be properly oriented relative to the supporting body and the guide rail. These supporting bodies, which are generally formed from steel, are produced with high precision and, if appropriate, ground at the front end. This opposing face is in any case properly oriented, thus ensuring proper positioning and orientation of the journal relative to the guide carriage.

As in the known linear guide, the journal can have a threaded portion which engages into a threaded hole in the supporting body. For mounting these journals, it is accordingly sufficient to screw said journals into the threaded hole, the first alignment face of the journal then butting against the opposing face of the guide carriage in the screwed-in state.

Similarly as in the known linear guide, the journal can be provided at its end remote from the guide carriage with a threaded hole for engaging a fastening screw. This development according to the invention is expedient if the additional component to be fastened is provided with a hole into which the fastening portion of the journal engages. At the end of the hole, the additional component then has an end face which is provided to rest against the front face of the journal. This end face is then preferably provided with a through-hole, thus allowing a fastening screw to be passed through this through-hole from the outside, this fastening screw engaging into this threaded hole in the journal. After the fastening of this fastening screw, the additional component can be properly fastened to this journal.

This end-side front face of the journal can also be configured as a second alignment face for orienting the abutting additional component. This second alignment face is then preferably properly positioned parallel to the first alignment face, so that the fully mounted additional component is properly positioned on the guide rail.

Ideally, the guide carriage is provided with two journals of this type; however, if appropriate, only one journal or else three or four journals can also be provided. A key advantage of the invention is that it eliminates the need for the separate adapter plate, wherein it is furthermore ensured that the head piece of the guide carriage cannot be clamped, but rather remains unloaded by the additional component.

BRIEF DESCRIPTION OF THE DRAWINGS

The invention will be described hereinafter with reference to an exemplary embodiment illustrated in two figures, in which.

DETAILED DESCRIPTION OF THE INVENTION

Figure 1:
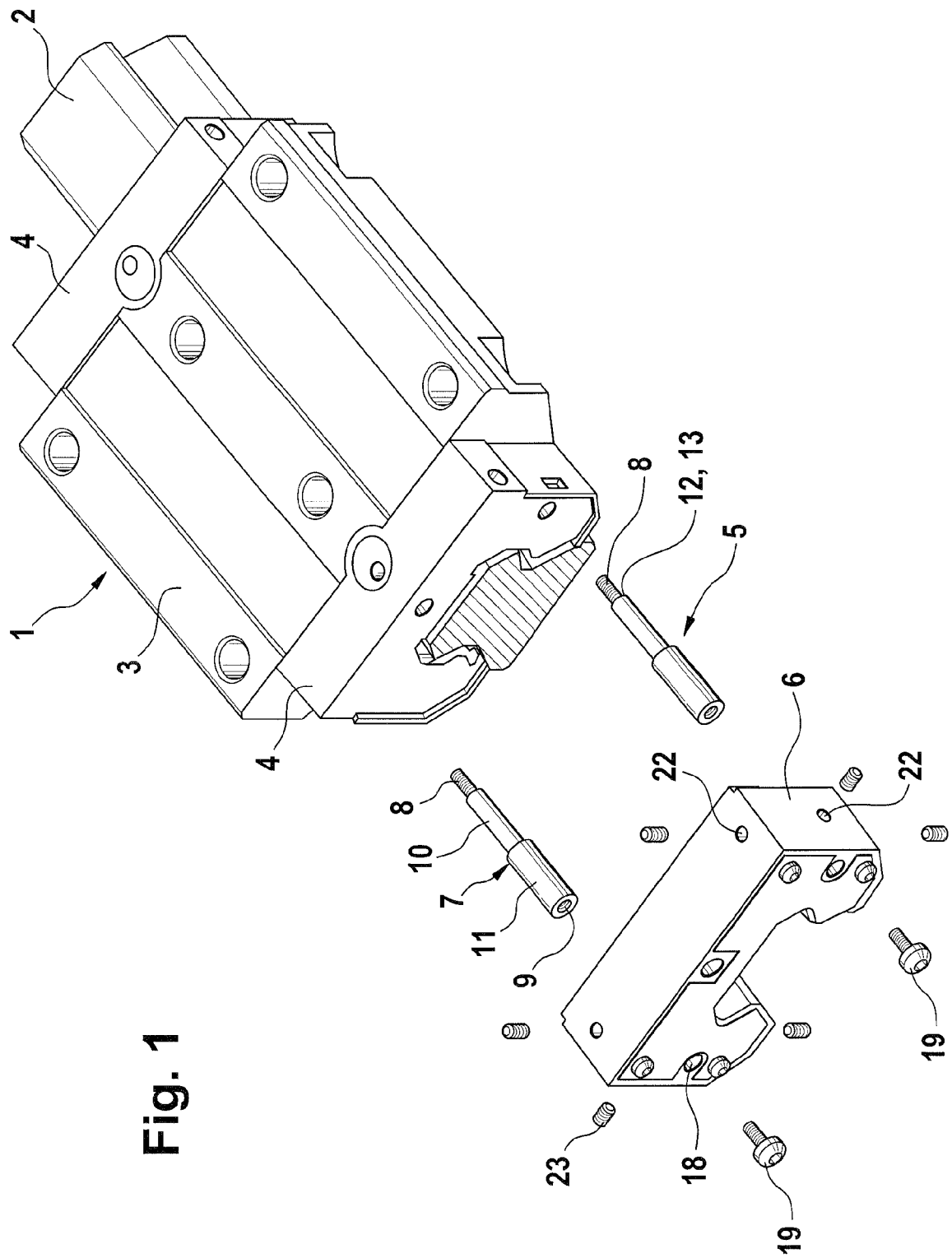
FIG. 1 is an exploded view of a linear guide according to the invention.
Figure 2:
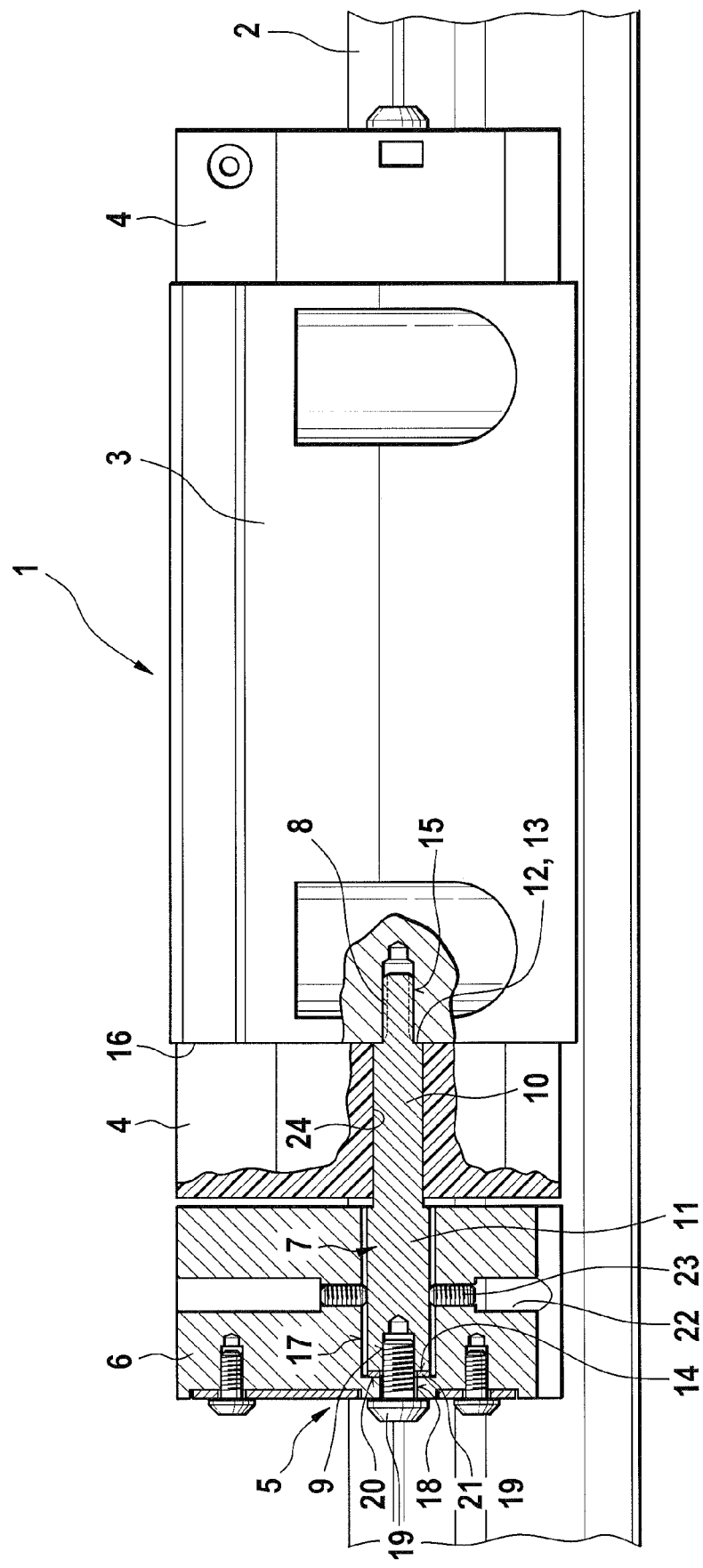
FIG. 2 is a partial longitudinal section through this linear guide according to the invention from FIG. 1.

The linear guide according to the invention illustrated in FIGS. 1 and 2 has a guide carriage 1 which is arranged in a longitudinally displaceable manner on a guide rail 2. The guide carriage 1 consists of a supporting body 3 made of steel and of head pieces 4 which are attached at both ends of the supporting body 3 at the front end. These head pieces 4 are made from plastics material by injection molding.

The guide carriage 1 has endless circulating channels (not shown here) for rolling bodies, each circulating channel having a load portion, a return portion and two deflection portions endlessly connecting the load portion to the return portion. In this endless circulating channel, rollers revolve endlessly in this endless circulating channel in the exemplary embodiment. In the load portion, the rollers roll off on running paths of the guide rail 2 and the supporting body 3. In the return portion, the rollers are fed back unloaded. The head pieces 4 are provided with the deflection portions in which the rollers are deflected and are guided out of the load portion into the return portion and from there back into the load portion.

This linear guide is provided with a fastening device 5 for fastening a measuring head 6 to the guide carriage 1. This fastening device 5 has journals 7 having at one end a respective threaded portion 8 and at the other end a threaded hole 9. Viewed from the threaded portion 8, there adjoin: a feed-through portion 10 and thereafter a fastening portion 11. In the transition from the threaded portion 8 to the feed-through portion 10, a shoulder 12 is configured on the journal 7. This shoulder 12 forms a first alignment surface 13 which is oriented transversely to the journal axis and also transversely to the guide rail 2.

At its end remote from the guide carriage 1, the journal 7 has a second alignment face 14 which is arranged parallel to the first alignment face 13.

The head pieces 4 are provided with through-holes 15 through which the journals 7 are fed with their feed-through portion 10. The threaded portions 8 of the journals 7 engage with threaded holes 15 provided on the supporting body 3. When the journals 7 are screwed tight to the supporting body 2, the shoulders 12 of the journals 7 rest against an opposing face 16 of the supporting body 3. These opposing faces 16 are at the same time the front faces of the supporting body 3 which are produced without additional expense already during the production of the supporting body. When the shoulder 12 of the journal 7 rests properly against the opposing face 16 of the supporting body 3, it is ensured that the journal 7 is properly oriented axis-parallel to the linear guide.

FIG. 2 clearly shows that the measuring head 6 is provided with a receiving hole 17 into which the fastening portion 11 of the journal 7 engages. The length of the fastening portion 11 is adapted to the depth of the measuring head 6.

The measuring head 6 is provided at its one front with a through-hole 18, a fastening screw 19 being fed through this through-hole 18 and screwed into the threaded hole 9 in the journal 7. When the fastening screws 19 are properly tightened, the measuring head 6 is fastened properly to the journal 7. The present linear guide according to the invention rules out the risk of any fastening screws provided for fastening the measuring head 6 clamping the head piece 4. On the contrary, it is ensured that the head piece 4 remains tension-free, and is fastened to the supporting body 3 merely by the fastening means which are conventionally provided.

In the transition from the through-hole 18 to the receiving hole 17 there is formed on the measuring head 6 a shoulder 20 which can either enter directly into abutment against the second alignment face 14 of the journal 7 or which alternatively can be pressed against this second alignment face 14, a resilient compensating ring 21 being interposed.

The measuring head 6 is furthermore provided with transverse holes 22 which are oriented transversely to the journal axis and which reach from the outer circumference of the measuring head 6 into the receiving hole 17. These transverse holes are provided with threaded portions into which threaded pins 23 are screwed. These threaded pins 23 can be screwed in until they eventually butt against the lateral surface of the fastening portion 11 of the journal 7. As two threaded pins are arranged opposing each other and on the same axis on both sides of the journal 7, additional positioning can be carried out by suitable screwing-in of these threaded pins 23 for properly orienting the measuring head 6.

The length of the journal is of a dimension such as to compensate for different coefficients of thermal expansion of steel and plastics material. No plastics material parts forming the circulation of the rolling bodies are clamped. The front of the supporting bodies is produced with sufficient precision relative to the running direction of the guide carriage.

LIST OF REFERENCE NUMERALS

1 Guide carriage
2 Guide rail
3 Supporting body
4 Head piece
5 Fastening device
6 Measuring head
7 Journal
8 Threaded portion
9 Threaded hole
10 Feed-through portion
11 Fastening portion
12 Shoulder
13 First alignment face
14 Second alignment face
15 Threaded hole
16 Opposing face
17 Receiving hole
18 Through-hole
19 Fastening screw
20 Shoulder
21 Compensating ring
22 Transverse hole
23 Threaded pin

The invention claimed is:

1. A linear guide, comprising:
a guide carriage, which is mounted in a longitudinally displaceable manner on a guide rail, having a supporting body and head pieces which are attached to the supporting body, one of the head pieces attached at a front end; and
a measuring head fastened by means of a fastening device to the guide carriage,
wherein the fastening device has a journal, one end of the journal is fastened in the supporting body of the guide carriage at the front end, and another end of the journal has a fastening portion which is in and fastens to the measuring head, the journal having a feed through portion which resides in the head piece.

2. The linear guide as claimed in claim 1, wherein the journal has a first alignment face, which is arranged inclined relative to a journal axis, against a first opposing face of the guide carriage for orienting the journal relative to the guide carriage.

3. The linear guide as claimed in claim 2, wherein the one end of the journal has a first threaded portion which engages into a threaded hole in the supporting body.

4. The linear guide as claimed in claim 1, wherein the journal has a first alignment face at the one end of the journal which opposes an opposing face of the supporting body at the front end.

5. The linear guide as claimed in claim 1, wherein a length of the fastening portion is adapted to a depth, which is extended in an axial direction of the journal, of the measuring head.

6. The linear guide as claimed in claim 1, wherein the journal has a threaded hole in the other end of the journal, which engages a fastening screw, for fastening the measuring head to the guide carriage.

7. The linear guide as claimed in claim 1, wherein the journal has a second alignment face at the other end of the journal for orienting the measuring head.

8. A linear guide, comprising:
a guide carriage mounted in a longitudinally displaceable manner on a guide rail;
a measuring head; and
an entirely cylindrical fastening device having a journal, at one end of the journal the fastening device has a threaded portion, adjoining the threaded portion is a feed-through portion, which has a greater circumference than the threaded portion, a first alignment face is formed in a transition region between the threaded portion and the feed-through portion, adjoin the feed-through portion is a fastening portion, which has a greater circumference than the feed-through portion and a threaded hole formed therein,
wherein the fastening device fastens the measuring head; to the guide carriage.

9. A linear guide, comprising
a guide carriage, which has a supporting body and a head piece attached to the supporting body, mounted in a longitudinally displaceable manner on a guide rail, the supporting body has a front face and a threaded hole formed therein and the head piece has a front face and a first through-hole; and
an entirely cylindrical fastening device with an outer circumference having a journal, at one end of the journal the fastening device has a threaded portion, adjoining the threaded portion is a feed-through portion which has a greater circumference than the threaded portion, a first alignment face is formed by a first shoulder in a transition region between the threaded portion and the feed-through portion forming a first alignment face, adjoin the feed-through portion is a fastening portion forming a second alignment face, which has a greater circumference than the feed-through portion and a threaded hole formed therein, and a second shoulder is formed in a second transition region between the feed-through portion and the fastening portion; and
an measuring head, which includes a front face, a rear face, a top face, a first side face, and a second side face, a first bottom face, and a second bottom face, the measuring head has a receiving recess extending inwardly from the rear face, a second through-hole extending inwardly from the front face to the receiving recess with a second shoulder formed between the receiving recess and the second through-hole, and holes extending inwardly from the top face, the first side face, the second side face, the first bottom face and the second bottom face transversely to the receiving recess,
wherein the fastening device fastens the guide carriage to the measuring head with the threaded portion extending into the threaded hole, the first shoulder contacting the front face of the supporting body, the feed-through portion extending through the first through-hole, second shoulder contacting the front face of the head portion, and the fastening portion extending into the receiving recess of the measuring head, the fastening device being fastened to the measuring head by a fastener, which extends from the through-hole and mates with the threaded body and by further fasteners screwed into the holes extending from the top face, the first side face, the second side face, the first bottom face and the second bottom face and contact the outer circumference of the fastening device.

* * * * *